May 18, 1948. T. E. CROCKETT 2,441,687
COPY CAMERA CARRIAGE SUPPORTING STRUCTURE
Filed Dec. 1, 1944 4 Sheets-Sheet 1
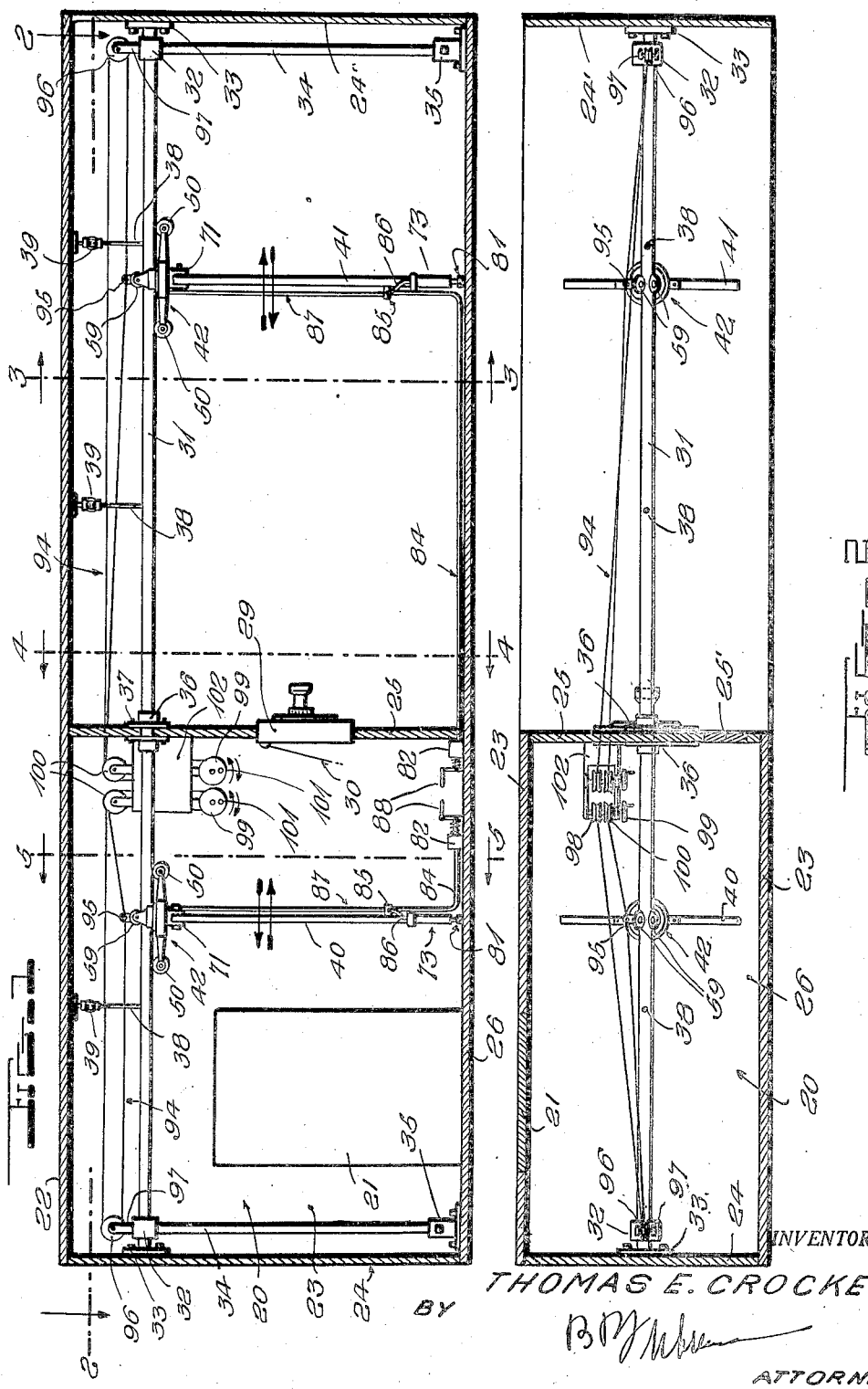
INVENTOR.
THOMAS E. CROCKETT,
BY
ATTORNEY

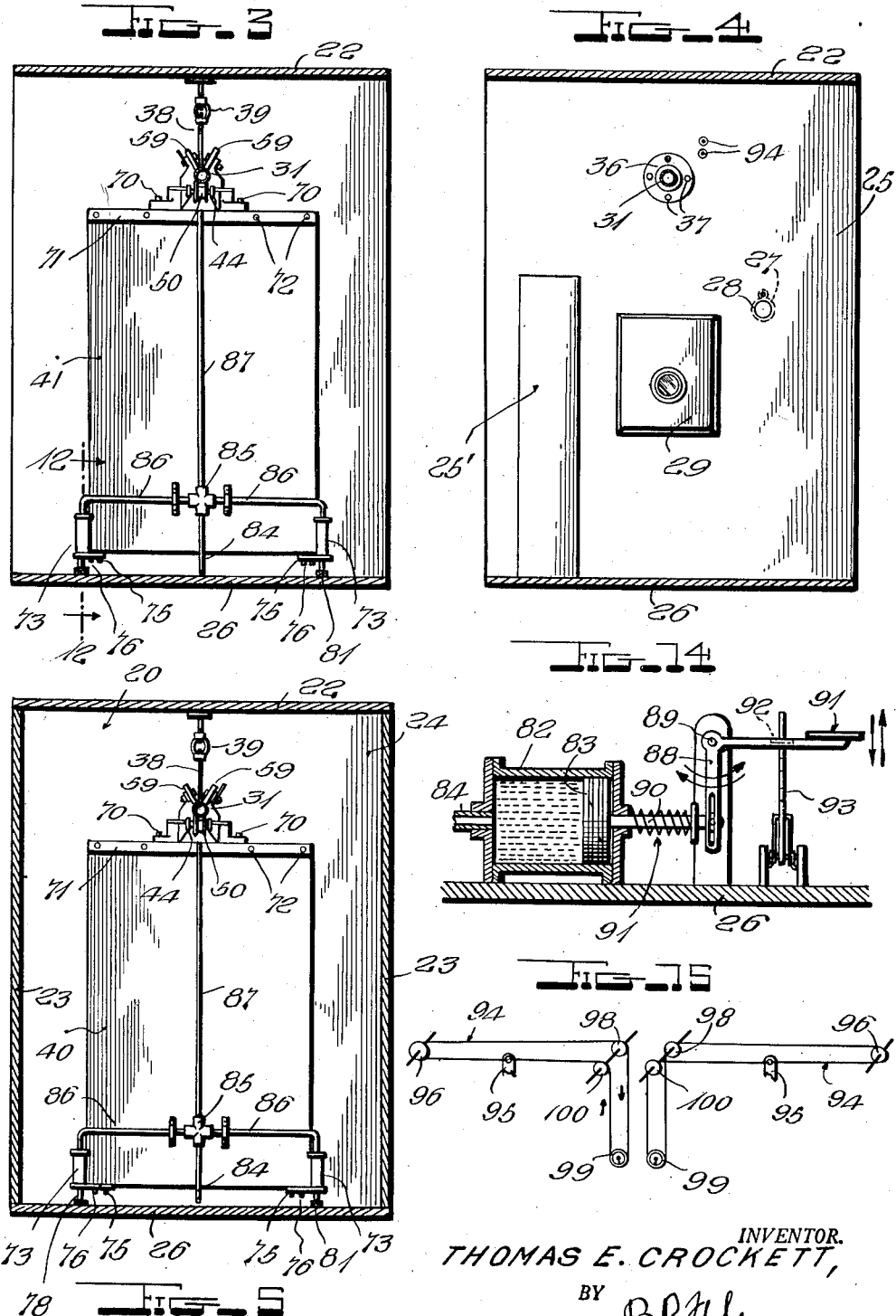

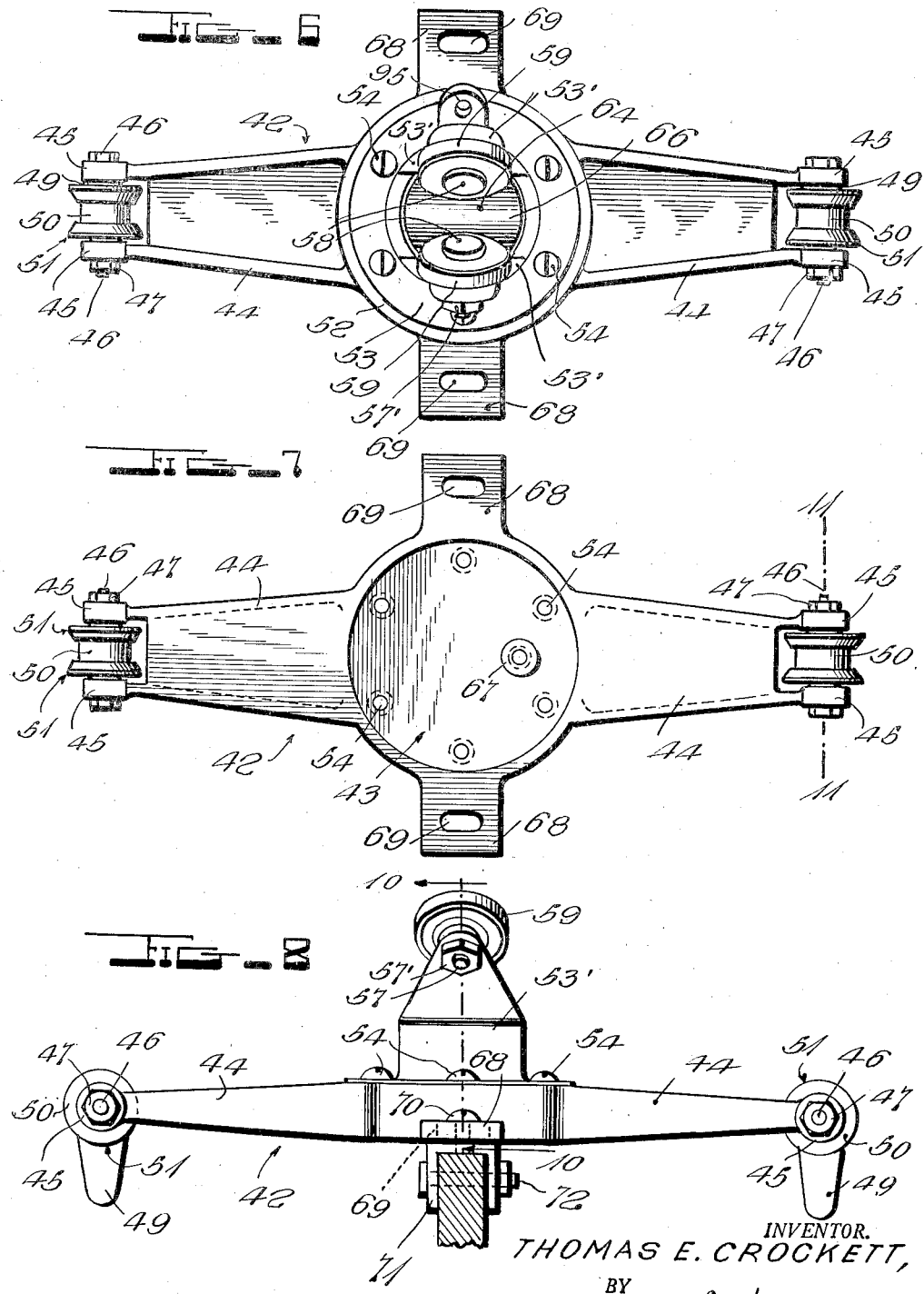

May 18, 1948. T. E. CROCKETT 2,441,687
COPY CAMERA CARRIAGE SUPPORTING STRUCTURE
Filed Dec. 1, 1944 4 Sheets-Sheet 4
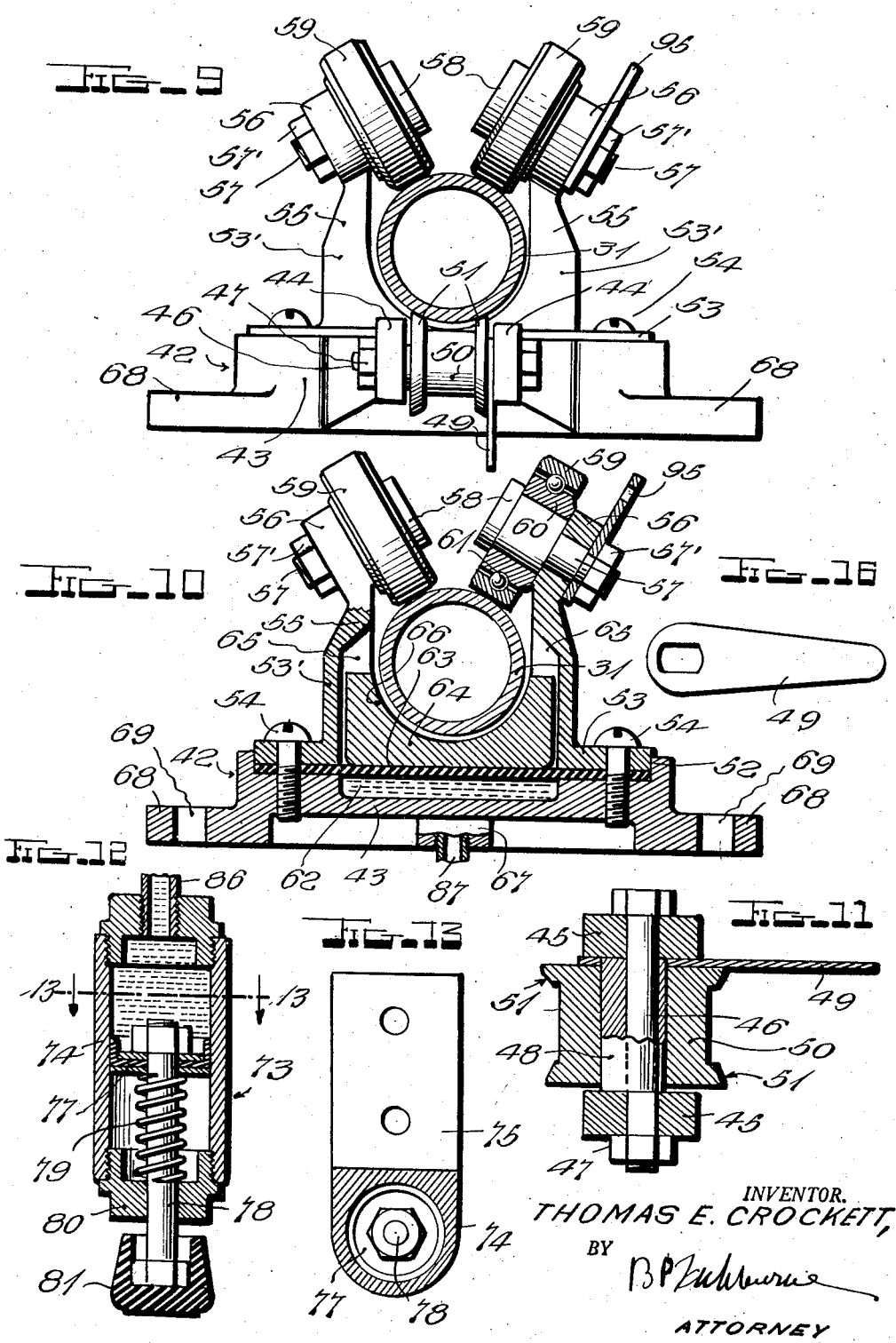
INVENTOR.
THOMAS E. CROCKETT,
BY
ATTORNEY Patented May 18, 1948

2,441,687

UNITED STATES PATENT OFFICE 2,441,687

COPY CAMERA CARRIAGE SUPPORTING STRUCTURE

Thomas E. Crockett, Nowata, Okla.

Application December 1, 1944, Serial No. 566,174

10 Claims. (Cl. 88—24)

My invention relates to photographic copying machines.

An important object of the invention is to provide a machine of the above mentioned character designed to copy large work and which is extremely simple in construction, inexpensive to manufacture, and reliable in operation.

A further object of the invention is to provide a machine of the above mentioned character wherein the lens device is stationary and the work panel and film panel are adjustable with relation to the stationary lens device, for producing the desired focus.

A further object of the invention is to provide remote control means for moving the work and film panels.

A further object of the invention is to provide means for pivotally suspending the panels so that they will assume a true perpendicular position.

A further object of the invention is to provide remote control means for securely locking the panel in the selected adjusted position.

A further object of the invention is to provide means for supporting the overhead rail so that it is accurately retained in a true horizontal position.

A further object of the invention is to eliminate the usual bellows of a camera and to provide a dark room which encloses the film panel and in which the operator works.

Other objects and advantages of the invention will be apparent during the course of the following description.

In the accompanying drawings forming a part of this application and in which like numerals are employed to designate like parts throughout the same, Figure 1 is a central vertical longitudinal section through a photographic copying machine embodying my invention, Figure 2 is a horizontal section taken on line 2—2 of Figure 1, Figure 3 is a transverse section taken on line 3—3 of Figure 1, Figure 4 is a similar view taken on line 4—4 of Figure 1, Figure 5 is a similar view taken on line 5—5 of Figure 1, Figure 6 is a plan view of a panel carriage, Figure 7 is a bottom plan view of the same, Figure 8 is a side elevation of the same, Figure 9 is an end elevation of the same, Figure 10 is a transverse vertical section taken on line 10—10 of Figure 8, Figure 11 is a transverse section taken on line 11—11 of Figure 7, Figure 12 is a longitudinal section taken on line 12—12 of Figure 3, Figure 13 is a horizontal section taken on line 13—13 of Figure 12, Figure 14 is a side elevation of a hydraulic device, parts in elevation, Figure 15 is a diagrammatic view of a pulley and cable system, and Figure 16 is a side elevation of a crank.

In the drawings, wherein for the purpose of illustration is shown a preferred embodiment of my invention, the numeral 20 designates a dark-room, which is light-tight, and is equipped in its side with a door 21. This dark-room may be twelve feet wide, twelve feet long, and ten feet high, altho the invention is in no sense restricted to these dimensions. The dark-room embodies a ceiling 22, sides 23, an outer end 24, and an inner end or wall 25, and floor 26. The dark-room is arranged within a larger room, and the end wall 25 is equipped with a door 25'. The end wall 25 is also equipped with a peep-hole 27, to be covered by a closure 28.

A lens device 29 is mounted upon the stationary end wall 25 and is therefore stationary and this lens device embodies the usual lens and shutter mechanism, operated by a pull element or cord 30, arranged within the dark-room. The lens device 29 is arranged in alignment with the centers of panels to be described.

The numeral 31 designates a track or rail, which is preferably tubular and extends longitudinally of the dark-room 20, at its longitudinal center, and near and spaced from the ceiling 22. The opposite ends of the track 31 are held within sockets 32, carried by brackets 33, which are bolted to the end wall 24 and the end wall 24' or the like. The sockets 32 also receive vertical posts 34, preferably tubular, the lower ends of which are held within sockets 35, attached to the floor 26. The posts 34 are adjustable within the sockets 32 and 35, and are clamped therein. The track 31 extends thru an opening in the end wall 25, and carries flanged sleeves 36, covering such opening and clamped to the end wall 25 by bolts 37 or the like. Vertical suspension rods 38 are supported from the ceiling 22 and are attached to the top of the tubular track 31, and these suspension rods are longitudinally adjustable, and for this purpose they are equipped with turn-buckles 39. The track 31 may thus be accurately adjusted to assume a true horizontal position and be maintained in such position.

Arranged within the dark-room 21 is a transverse vertical film panel 40, and a transverse vertical work panel 41 is arranged exteriorly of the dark-room in advance of the lens device 29. These panels are preferably identical, and may be formed of wood, so that the work or film may be attached thereto by thumb-tacks or the like. These panels may be made of any other suitable material and any other suitable means may be employed to secure the associated objects to the same.

Each panel is supported by a carriage 42, including a body portion 43, which is horizontal. Preferably formed integral with the body portion 43, which is preferably cylindrical, are longitudinal horizontal arms 44, diametrically oppositely disposed. The outer end of each arm 44 is forked, providing apertured knuckles 45, receiving a horizontal transverse bolt 46, carrying a nut 47. A cylindrical sleeve 48 is eccentrically pivotally mounted upon the bolt 46 and has a lever 49 rigidly secured to one end thereof. A grooved roller 50 is rotatably mounted upon the sleeve 48 and the groove of the roller provides circularly curved faces 51, to contact with the track 31. By turning the lever 49 the roller 51 may be raised or lowered and then locked in the selected elevation by a manipulation of the nut 47 to clamp the sleeve 48 between the knuckles 45. The body portion 43 is arranged beneath the track 31, and this body portion has a cylindrical upper recess 52 for receiving a horizontal ring 53, secured in place by screws 54, or the like. The ring 53 carries vertical arms 53', projecting above the same, having inclined extensions 55, provided with angularly disposed upwardly diverging knuckles 56, which are apertured to receive bolt-extensions 57 of stub-shafts 58. The bolt-extensions carry nuts 57'. Surrounding each stub-shaft 58 is an annular roller 59, disposed in concentric relation with an annular race-way 60, arranged upon the stub-shaft 58 and preferably clamped in position against movement. Bearing-elements 61 are arranged between the parts 59 and 60, as shown. The rollers 59 are arranged above and travel upon the track 31, and are disposed at equal distances from a vertical line passing thru the center of the track 31. This causes the rollers 59 to support the carriage and balance the same upon the track 31. The body portion 43 has a chamber 62 formed therein, and this chamber is covered by a flexible diaphragm 63, having its marginal edge clamped in place by the ring 53. Arranged above the diaphragm 63 is a locking element or plunger, or shoe 64, which is cylindrical and is guided within cylindrically curved recesses 65, formed upon the inner faces of the vertical arms 53'. The clamping element or shoe 64 has a cylindrically curved clamping face 66, to be brought into engagement with the track 31. A tubular boss 67 is formed upon the body portion 43 and leads into the chamber 62. The body portion 43 is provided with horizontal extensions or ears 68, arranged at 90° from the arms 44. These horizontal extensions have transverse slots 69, to receive screws or bolts 70, engaging the top of a transverse horizontal channel 71. This channel may be adjusted to a true transverse position and then locked to the extensions 68 by the screws 70. The channel 71 receives the upper end of each panel 40 and 41, and the panel is rigidly held within the channel by bolts 72.

Each panel is equipped at its lower corners with floor-locking devices 73. Each floor-locking device includes a vertical cylinder 74, having apertured ears 75, rigidly secured to the panel by bolts 76. Mounted to reciprocate within the cylinder 74 is a plunger 77, rigidly secured upon a vertical rod 78, and a spring 79 is arranged beneath the plunger 77. The rod 78 extends thru a head 80 and is equipped with a shoe 81, preferably formed of rubber. Hydraulic means is provided to move the plunger 77, comprising a cylinder 82, receiving a plunger 83. This cylinder forces the fluid thru a pipe 84, connected with a cross-coupling 85, connected with pipes 86, which lead to the top of the cylinders 74. A pipe 87 is also connected with the coupling 85 and leads to the tubular boss 67. Pedally operated means is provided to move the plunger 83, including a bell-crank lever 88, pivoted at 89. This bell-crank lever is pivoted to a rod 90, which is secured to the plunger 83, and a spring 91 surrounds the rod and shifts it outwardly. The horizontal arm of the bell-crank lever serves as a pedal and is provided with a foot engaging portion 91 and also has a tooth 92, to engage with a spring pressed pivoted latch 93. It is thus seen that the lever 88 may be depressed by the foot and held locked in the lowered position by the latch 93, until the latch is shifted out of engagement with the tooth 92. The plunger 83 therefore moves forwardly and the fluid moves the plungers 77 downwardly and the shoes 81 clamp against the floor. Prior to this clamping engagement, the fluid entering the chamber 62 has moved the plunger or shoe 66 upwardly and clamps or locks the same to the track 31. The plunger or shoe 64 moves quicker than the plungers 77, whose movement is opposed by the springs 79. Further, the area of the diaphragm 63 is much greater than the area of either plunger 77, and after the plunger or shoe 64 has clamping engagement with the track 31, this clamping engagement cannot be broken by the action of either plunger 77. Should the floor have irregularities in its surface, the separately acting plungers 77 will compensate for such irregularities, but the plunger or shoe 64 will hold the panel in the true vertical position. Any other suitable means may be employed to supply fluid pressure to the cylinders 74 and chamber 62, either liquid or air under suitable pressure.

Manually operated remote control means are provided to shift each carriage 42. This means includes a cable or flexible element 94, one end of which is attached to an eye 95 secured to the stub-shaft 58. This cable extends longitudinally and is passed about a guide pulley 96 carried by a stationary bracket 97. The upper run of the cable is passed downwardly about a pulley 98 and is then wrapped one time about a pulley 99 and then passes upwardly about a pulley 100 and has its opposite end attached to the eye 95. The pulley 99 is provided with a crank or handle 101, by means of which it may be manually turned. The pulleys 98 and 100 are carried upon the same shaft, supported in a bracket 102, secured to the end wall 25. The pulley 99 is supported by the bracket 102 secured to the end wall 25. The wire 94 from the panel 41 extends thru openings in the end wall 25, which openings may be felt lined to exclude light.

The operation of the apparatus is as follows:

The work to be copied, which may be a drawing, map or the like, is mounted flat upon the face of the panel 41 next to the lens device 29, and is secured to panel by thumb tacks or other suitable means. The panel 41 is preferably eight feet high and four and one-half feet wide and the panel 40 is preferably of the same size. Each panel at its bottom may be spaced about one inch from the floor. The operator now enters the dark-room and manipulates the pulley 99 for shifting the panel 41 the correct distance from the lens device. This correct distance may be determined by scale or by looking at the work through the lens. The adjustment of the panel is effected to provide desired focus, depending upon size of the work. When it is desired to make a very large copy the panel 41 is adjusted to a position adjacent to the front end of the track 31. The panel 40 is also adjusted by turning its pulley 99, so that this panel is arranged a suitable distance from the lens device 29, so that the image will be projected upon the film which is now mounted upon the panel 40. It is thus seen that for effecting a proper focusing of the camera, the lens device 29 is stationary, while the panels 40 and 41 are shifted with respect to the lens device, as distinguished from the conventional camera in which the lens is connected with the bellows constituting the dark room and is shifted with relation to the work. The operator enters the dark room which is rendered light tight, and may pass between the panel 40 and the side walls of the dark room. After these panels are adjusted, they are locked in the selected adjusted positions. This is done by the operator depressing the lever 88 with the foot, and locking the lever in the lowered position. The clamp or shoe 64 first rises and has clamping engagement with the track 31, whereby the panel is locked in the true perpendicular position. Shortly after this action, the plungers 77 move downwardly sufficiently to clamp the shoes 81 to the floor, thereby rigidly holding the lower corners of the partition against movement. With the parts thus adjusted the lens device 29 is actuated to make the copy by pulling the cord 30. When the partition is being adjusted longitudinally of the track 31, the guide roller faces 51 contact with the lower face of the track 31, which is circular in cross section, and serve to hold the panel against perceptible movement while traveling. The panel and carriage 42 project laterally beyond the opposite sides of the track 31 for equal distances and this unit is therefore balanced against lateral tilting and will remain plumb and will be locked in this position by the clamp or shoe 64, as described.

An important feature of the invention is the arrangement of the single track 31 above and at the central longitudinal axes of the partitions, affording a highly simplified construction for suspending and guiding these partitions. This renders it possible to maintain the partitions in accurate alignment and to shift the partitions for considerable distances from the lens device, without liability of disturbing this accurate alignment.

A suitable source of light is arranged exteriorly of the dark room, in proper relation to the work and lens device.

It is to be understood that the form of my invention herewith shown and described is to be taken as a preferred example of the same, and that various changes in the shape, size, and arrangement of parts, may be resorted to, without departing from the spirit of my invention or the scope of the subjoined claims.

Having thus described my invention, what I claim is:

1. In a photographic copying machine wherein a lens is arranged in cooperative relation to a dark room and a single rail circularly curved in cross section is arranged above and extends longitudinally of the axis of the lens, the combination with the single rail of a carriage arranged beneath the rail and including a body portion, arms secured to the body portion and arranged beneath the rail and extending longitudinally of the rail, guide rollers secured to the arms to engage the rail, rollers traveling upon the upper portion of the rail, means suspending the carriage from the last named rollers, a shoe mounted upon the carriage adjacent to the rail, means to move the shoe into clamping engagement with the rail, means to move the carriage, and a panel suspended from the carriage, the arrangement being such that the carriage is pivotally suspended from the rail to swing transversely thereof to assume a plumb position.

2. In a photographic copying machine wherein a lens is arranged in cooperative relation to a dark room and a single rail circularly curved in cross section is arranged above the lens and extends longitudinally of the axis of the lens, the combination with the single rail of a carriage arranged beneath the rail and extending laterally beyond the sides of the rail for substantially equal distances, upstanding arms secured to the carriage and arranged upon opposite sides of the single rail and extending above the rail, transversely spaced rollers mounted upon the arms and having their axes of rotation arranged transversely of the rail and engaging the top portion of the rail, longitudinal arms arranged beneath the rail and secured to the carriage, guide rollers mounted upon the longitudinal arms and arranged to engage the lower portion of the rail, the arrangement being such that the carriage is pivotally mounted upon the rail to swing transversely thereof, means to move the carriage, and a supporting element attached to the carriage, the arrangement being such that the carriage is pivotally suspended from the rail to swing transversely thereof for assuming a plumb position.

3. In a photographic copying machine wherein a lens is arranged in cooperative relation to a dark room and a single rail circular in cross section is arranged above the lens and extends longitudinally of the axis of the lens, the combination with said single rail of a carriage mounted beneath the single rail, roller means engaging the upper portion of the rail and supporting the carriage, arms arranged beneath the rail and extending longitudinally thereof and attached to the carriage, cylinders eccentrically pivotally mounted upon the arms, means to turn the cylinders upon their pivots, rollers mounted upon the cylinders to engage the lower portion of the rail, means to move the carriage, and a supporting element attached to the carriage for holding the work.

4. In a photographic copying machine wherein a lens is arranged in cooperative relation to a dark room and a single rail circular in cross section extends longitudinally of the axis of the lens, the combination with the single rail of, a carriage disposed beneath the single rail, roller means engaging the upper surface of the rail and pivotally supporting the carriage so that it may swing transversely of the rail and assume a plumb position, a shoe mounted upon the carriage and having a circularly curved surface and disposed beneath and adjacent to the rail, means to move the shoe upwardly to bring the circularly curved surface into clamping engagement with the rail, means to move the carriage, and a supporting element suspended from the carriage.

5. In a photographic copying machine wherein a lens is arranged in cooperative relation to a a dark room and a single rail circularly curved in cross section is arranged above the lens and extends longitudinally of the axis of the lens, the combination with the single rail of a carriage arranged beneath the rail and including a body portion, arms secured to the body portion and arranged beneath the rail and extending longitudinally of the rail, guide rollers secured to the arms to engage the rail, rollers traveling upon the upper portion of the rail and having their axes of rotation transversely of the rail, means suspending the carriage from the last named rollers, a shoe mounted upon the carriage adjacent to the rail, means beneath the shoe for receiving a fluid under pressure, a panel suspended from the carriage, cylinders mounted upon the lower end of the panel near its corners, plungers within the cylinders, rods secured to the plungers, shoes carried by the rod to clamp against the floor, resilient elements to oppose the movement of the plungers toward the floor, and common means to supply a fluid under pressure to the fluid receiving means and to the cylinders, the arrangement being such that the rail shoe clamps the rail before the other shoes clamp the floor.

6. In a photographic copying machine, a support, a lens, means mounted upon the support and securing the lens in place, a rail mounted upon the support and arranged near and above the lens and extending longitudinally of the axis of the lens and substantially parallel with such axis, a carriage pivotally mounted upon the rail to swing substantially vertically transversely of the rail, said carriage being movable longitudinally of the rail, a panel mounted upon the carriage and depending below the carriage, the carriage and panel extending for substantially equal distances upon opposite sides of the rail, holding means secured to the carriage and extending longitudinally of the rail and engaging the rail, means to lock the carriage against transverse swinging movement upon the rail including an element for clamping engagement with the rail, and means to move the carriage longitudinally of the rail, said holding means preventing the carriage and panel swinging vertically longitudinally of the rail when the carriage is moved longitudinally.

7. In a photographic copying machine, a support, a lens, means mounted upon the support and securing the lens in place, a rail mounted upon the support and arranged near and above the lens and extending longitudinally of the axis of the lens in substantial parallel relation to the axis, a carriage pivotally mounted upon the rail to swing substantially vertically transversely of the rail, said carriage being movable longitudinally of the rail, a panel mounted upon the carriage and depending below the carriage, the carriage and panel extending transversely of the rail for substantially equal distances upon the opposite sides of the rail, arms secured to the carriage and extending in opposite directions longitudinally of the rail, rollers, adjustable means to mount the rollers upon the arms to shift them with relation to the arms toward the rail, means to lock the carriage against transverse swinging movement including an element for clamping engagement with the rail, means to move the carriage longitudinally of the rail, said rollers holding the carriage and panel against vertical swinging movement longitudinally of the rail when the carriage is moved longitudinally.

8. In a photographic copying machine, a support, a lens, means mounted upon the support and holding the lens in place, a rail which is circular in cross section and mounted upon the support and arranged above the lens and extending longitudinally of the axis of the lens and substantially parallel with such axis, a carriage arranged near and beneath the rail, arms arranged above the carriage and secured thereto and disposed upon opposite sides of the rail, rollers mounted upon the arms and engaging the upper portion of the rail, longitudinal arms secured to the carriage and arranged beneath the rail and extending in opposite directions, rollers carried by the arms and engaging the rails, the last named rollers preventing the carriage from swinging substantially vertically longitudinally of the rail, all of the rollers being shiftable circumferentially of the rail so that the carriage can swing substantially vertically transversely of the rail, a panel mounted upon the carriage and depending below the carriage, the carriage and panel extending transversely of the rail for substantially equal distances upon opposite sides of the rail, a shoe mounted upon the carriage to engage the rail, remote control means to operate the shoe, means to move the carriage longitudinally of the rail.

9. In a photographic copying machine, a support, a lens, means mounted upon the support to hold the lens in place, a rail mounted upon the support near and above the lens and extending longitudinally of the axis of the lens and substantially parallel with the axis, a carriage mounted to travel longitudinally of the rail and being pivotally mounted upon the rail to swing transversely thereof, a panel mounted upon and depending from the carriage, the carriage and panel extending transversely of the rail and projecting upon opposite sides thereof for substantially equal distances, an upper shoe mounted upon the carriage and arranged to engage the rail, a pair of lower shoes mounted upon the panel near its lower corners to engage with the floor, and fluid pressure operated means to first cause the upper shoe to have clamping engagement with the rail and said fluid pressure operated means subsequently causing the lower pair of shoes to have clamping engagement with the floor.

10. In a photographic copying machine, a support, a lens, means mounted upon the support for holding the lens in place, a rail arranged above the lens and extending longitudinally of the axis of the lens, a carriage pivotally mounted upon the rail to swing transversely thereof, the carriage being movable longitudinally of the rail, a panel mounted upon the carriage and depending therefrom, the carriage and panel extending transversely of the rail upon opposite sides thereof for substantially equal distances, an upper shoe mounted upon the carriage to engage the rail, a movable member to shift the upper shoe, a lower shoe mounted upon the panel to engage with the floor, a movable member connected with the shoe to move it and having a smaller area than the first named movable member, a spring to oppose the movement of the second named movable member, and common means for supplying a fluid under pressure to the members to move them.

THOMAS E. CROCKETT.

(References on following page)

REFERENCES CITED

The following references are of record in the file of this patent:

UNITED STATES PATENTS

| Number | Name | Date |
|---|---|---|
| 547,855 | Lee | Oct. 15, 1895 |
| 1,033,404 | Huebner | July 23, 1912 |
| 1,452,077 | Huebner | Apr. 17, 1923 |
| 1,748,798 | Ryan | Feb. 25, 1930 |
| 1,991,818 | Nissen | Feb. 19, 1935 |
| 2,150,974 | Huebner | Mar. 21, 1939 |
| 2,246,502 | Bramsen et al. | June 24, 1941 |
| 2,262,288 | Klipstein | Nov. 11, 1941 |
| 2,289,121 | Huebner | July 7, 1942 |
| 2,306,885 | Klemm et al. | Dec. 29, 1942 |
| 2,356,960 | Wekeman | Aug. 29, 1944 |
| 2,406,770 | Huebner | Sept. 3, 1946 |